United States Patent [19]

Borgren et al.

[11] 4,284,902  
[45] Aug. 18, 1981

[54] WAVE ACTION GENERATING SYSTEM

[75] Inventors: Peter M. Borgren; Albert J. Amatuzio, both of Duluth, Minn.

[73] Assignee: Hydrodynamic Energy Systems Corp., Superior, Wis.

[21] Appl. No.: 127,990

[22] Filed: Mar. 7, 1980

Related U.S. Application Data

[63] Continuation-in-part of Ser. No. 98,214, Nov. 28, 1979.

[51] Int. Cl.³ .............................................. F03B 13/12
[52] U.S. Cl. ...................................... 290/53; 417/331
[58] Field of Search ...................... 290/42, 43, 53, 54; 60/398; 417/330, 331, 332, 333

[56] References Cited

U.S. PATENT DOCUMENTS

| 870,706 | 11/1907 | Woodard | 60/504 |
| 3,569,725 | 3/1971 | Rosenberg | 290/53 |
| 3,894,241 | 7/1975 | Kaplan | 290/53 |
| 3,959,663 | 5/1976 | Rusby | 290/53 |

FOREIGN PATENT DOCUMENTS

2334840  8/1977  France ...................................... 290/53

*Primary Examiner*—J. V. Truhe
*Assistant Examiner*—D. L. Rebsch
*Attorney, Agent, or Firm*—Schwartz, Jeffery, Schwaab, Mack, Blumenthal & Koch

[57] ABSTRACT

An electric generating system relying on wave action forces, wherein a shallow reservoir is provided and confined by a cofferdam or silo so as to provide a hydrostatic head between the reservoir and the open body of water exterior to the cofferdam or silo. The hydrostatic head drives turbine generators, and spent water is discharged from the generators into the reservoir. Pump and float assemblies are mounted on the exterior of the cofferdam or silo and function to withdraw water from the reservoir responsive to upwardly directed wave forces thereby maintaining the hydrostatic head.

14 Claims, 6 Drawing Figures

WAVE ACTION GENERATING SYSTEM

CROSS-REFERENCE TO RELATED APPLICATION

The present application is a continuation-in-part of our pending application Ser. No. 98,214, filed Nov. 28, 1979.

BACKGROUND OF THE INVENTION

The present invention relates as indicated to a wave action generating system, and relates more particularly to a system for generating electric power through the utilization of wave forces in bodies of water such as oceans, seas, and lakes appropriate in size.

Wave action generators for producing electric energy are well known in the art. All electric generating systems of this general type operate on the principal of using the vertical motion inherent in the formation and movement of the waves to effect vertical movement of a component of the generating system. A typical prior art system translates such vertical movement to rotary movement to directly or indirectly drive a generator shaft or the like by means of which the electric power is generated. Other systems use such vertical wave motion to operate pumps for pumping the water to a storage vessel or reservoir, with the hydrostatic pressure of the stored water subsequently driving a turbine generator or the like by means of which electric power is directly produced. This latter type of system is disclosed in our pending application referred to above, and examples of the vertical-to-rotary systems are disclosed in U.S. Pat. No. 870,706 to H. P. Woodard, U.S. Pat. No. 3,894,241 to S. Kaplan, and U.S. Pat. No. 3,959,663 to J. V. Rusby. It will be understood that these patents are simply exemplary of systems of that type, and are by no means exhaustive of the extensive body of art operating on that general principal.

A major problem with wave action generating systems known in the prior art is their relatively complex and consequently costly construction. This results in relatively high manufacturing and installation costs, with the consequent capital investment of systems of this type being a substantial detriment to the commercial employment of the systems, particularly where the energy output does not justify the capital expenditures. In this regard, the art is replete with systems of a more simplified construction, but the energy derived is not commercially significant.

It will be understood that the systems must be designed to withstand and satisfactorily handle wave swells at their greatest peak, and must also be constructed to accommodate and satisfactorily handle, on an economic basis, waves of normal or less than normal height. Where installations are mounted in saline water conditions, the system components are subjected to highly corrosive conditions thereby causing significant maintenance problems which have not been satisfactorily dealt with in prior art systems.

SUMMARY OF THE INVENTION

A principal object of the present invention is to provide a wave action generating system which can be used essentially at any location where the vertical component of the wave forces meets or exceeds a level to make the system economically feasible. The use of wave forces provides a continuous and inexhaustible source of energy and serves as an efficient and useful alternative to the utilization of fossil fuels for energy production. Moreover, the production of electrical energy in accordance with the present invention is totally non-polluting, an obvious advantage during the present state of environmental concern.

Once installed, the cost per kilowatt hour of energy production is more than competitive at present rates of alternative energy sources, and with the continual increase in cost of fossil fuels and other forms of energy sources, wave action systems should prove to be of substantial economic benefit.

A further object of the invention is to provide a wave action generating system which is extremely simple in construction and which can be installed quickly and easily. All of the components of the system are easily fabricated or commercially available, and many of the components are duplicative and thus interchangeable, thereby facilitating large scale installation and maintenance of the system.

Our co-pending application referred to above employs a plurality of individual pumps mounted on the floor of the body of water, with each pump discharging water during the upward or pumping stroke of the pump piston to a reservoir. Water collected in the reservoir is thereafter gravity fed under hydrostatic pressure to a turbine generator for production of electric energy. Although certain aspects of the pumps employed in the present invention are similar to the pump construction disclosed and claimed in our pending application, the basic principal of operation of the system is significantly different.

In accordance with the present invention, a support structure is mounted in the body of water so as to define a relatively shallow reservoir, with the depth of water in the reservoir being at a predetermined level, for example, 15 to 50 feet, below the water level in the surrounding body of water. A plurality of pump assemblies with associated float members are mounted on the support structure and function to draw water from the reservoir into the bottom pump chamber of each pump when the pump piston is raised due to wave action. When the crest of the wave has passed, a counterweight attached to the pump piston biases the same downwardly thereby pumping the water to the open body of water in which the pump assemblies are mounted. The hydrostatic head of the open body of water relative to the relatively shallow reservoir results in the movement of water under such head through one or more turbine generators installed in the wall of the support structure. The turbine generators are preferably mounted at or below the levels of the pipes through which the water is drawn from the reservoir, with the water being discharged from the turbines to the reservoir to complete the cycle. The turbine generators are mounted in suitable housings as known in the art, and the energy produced therefrom taken off in known fashion.

Thus, the support structure serves the important function of establishing and maintaining the relatively shallow reservoir, through the withdrawal and replenishment of water as described, and consequently the hydrostatic head existing exterior to the support structure. As the float members are raised as a result of the wave action, a negative pressure is established in the lower pump chamber whereby water from the reservoir is drawn through feed pipes into the bottom chamber of the pumps.

In accordance with the invention, the support structure can consist of a cofferdam, or an annular silo-type construction, which can be either open ended or closed at the top. If closed, a vent pipe is provided to maintain ambient pressure within the enclosed silo. The silo or cofferdam is mounted in the desired depth of water adjacent the shore, thereby defining and confining a relatively shallow reservoir, with water being withdrawn from the reservoir prior to operation of the system as necessary to establish the desired hydrostatic head resulting from the difference in height of the water in the reservoir and the height of the water in the open body of water surrounding the cofferdam or silo. The pipes through which water is withdrawn and passed to the bottom pumping chambers are submerged in the reservoir, as are the discharge outlets of the turbine generators.

As many pump assemblies as desired can be mounted on the cofferdam or silo, with the silo shape being particularly advantageous in that pump assemblies can be mounted around the entire circumference thereof.

A further feature of the present invention is the provision of guide frame structure for controlling the vertical movement of the float members. The latter in a preferred form of the invention comprise air bags which are mounted within a generally rectangular float carriage, with the sides of the carriage being provided with rollers which engage vertical guide members whereby the carriage moves vertically in response to the wave action. This prevents the float carriage and float members from being subjected to torque, which is a substantial problem in certain prior art arrangements due to the non-linear form of the wave action forces. Means are also provided for adjustably controlling the distance between the float members and the pump housing, which is fixedly mounted on the support means, thereby adapting the system to the particular installation conditions. The float members can be positioned at normal water level, or they can be entirely submerged as long as they are subjected to wave action to provide the necessary vertical movement of the float members.

A further feature of the invention is the provision of a unique pipe and valving arrangement communicating the lower chamber of the pump with both the reservoir and the open body of water. The pipe includes a first section which extends generally horizontally between the reservoir and the open body of water, through the wall of the support structure, a second pipe section which is generally vertical and which communicates at the bottom thereof with the first pipe section and at the top thereof with the bottom of the lower pump chamber, and a third pipe section which communicates with the second pipe section and at its outer end with the open body of water. Valves are provided at the junctures of the first and second, and second and third pipe sections whereby water withdrawn from the reservoir during the negative pressure condition in the lower pump chamber is prevented from bypassing the pump chamber, with the first pipe section being closed during descent of the pump piston whereby water is discharged from the lower chamber through the second pipe section and the third pipe section to the open body of water.

These and other objects of the invention will become apparent as the following description proceeds in particular reference to the application drawings.

DETAILED DESCRIPTION OF THE APPLICATION DRAWINGS

Figure 6:
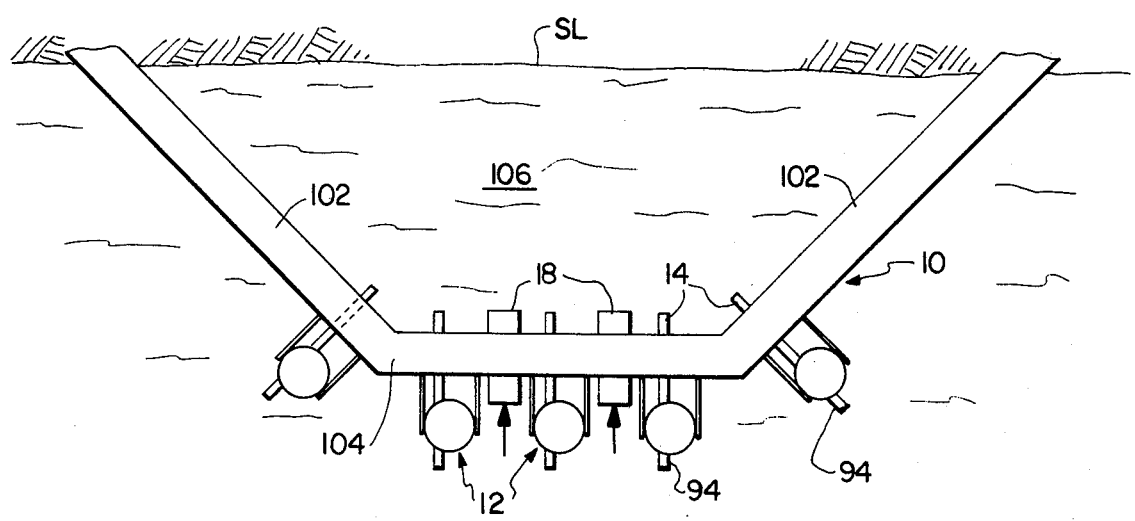
Figure 5:
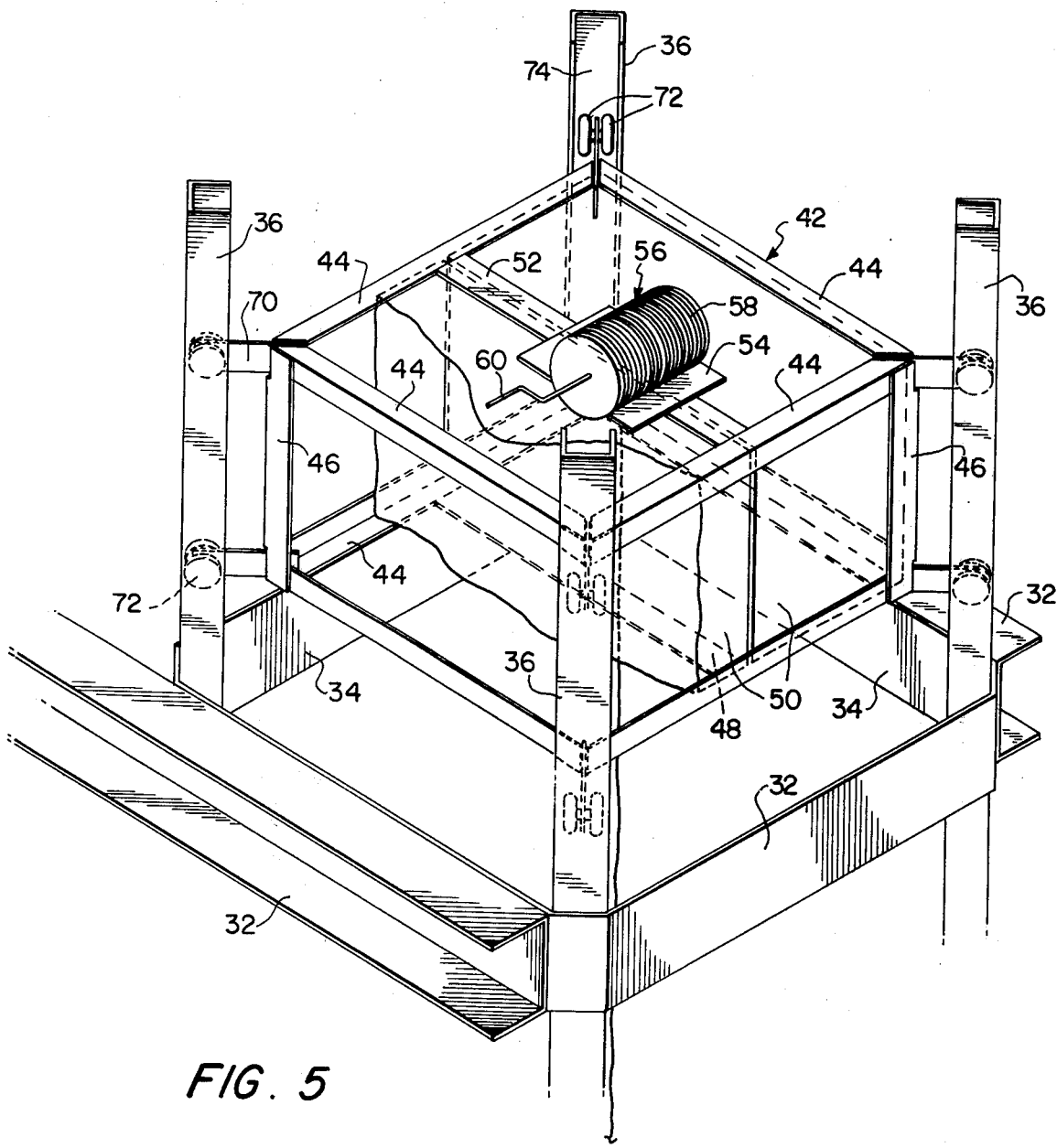

FIG. 5 is a fragmentary perspective view showing in more detail the construction of the float frame, the manner in which the same is guided for vertical movement, and the cable and winch by means of which the positon of the float frame and floats can be varied relative to the fixed pump housing, and FIG. 6 is a fragmentary top plan view of an alternative form of the invention in which the support structure for the pump assemblies and related floats comprises a cofferdam installed in the body of water so as to define therewithin a shallow reservoir.

DETAILED DESCRIPTION OF THE PREFERRED EMBODIMENTS

Figure 1:
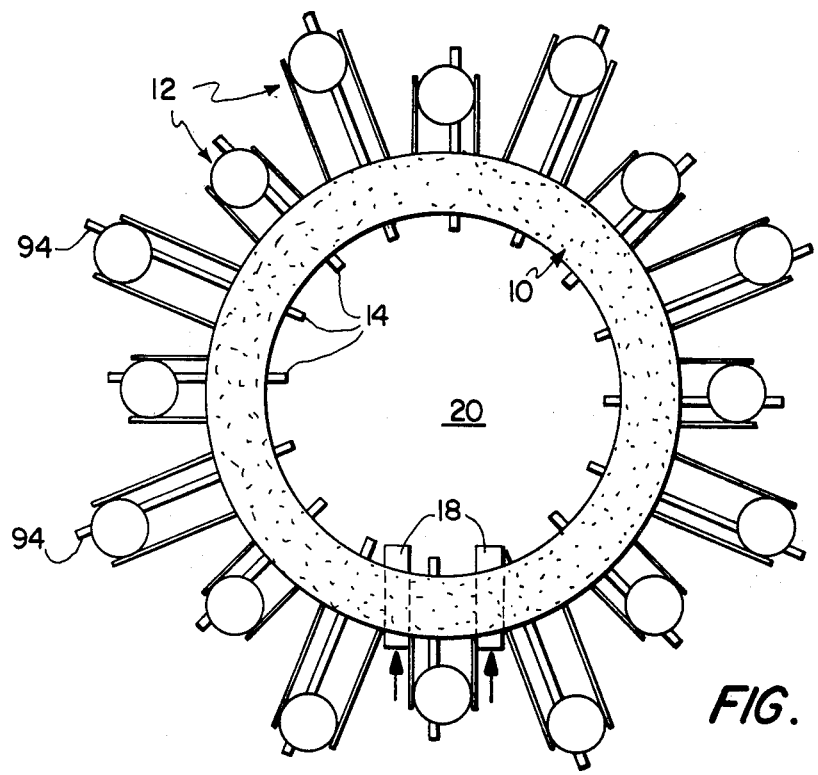
FIG. 1 is a top plan view, partially schematic, illustrating one form of the invention in which pump and associated float assemblies are mounted on and circumferentially around a silo having an open top.

Referring now in more detail to the application drawings, wherein like parts are indicated by like reference numerals, and initially to FIG. 1, there is illustrated therein one form of the invention in which a silo generally indicated at 10 is installed on the floor of a body of water, and a series of pump assemblies commonly designated at 12 are mounted on the exterior walls of the silo. For sake of simplicity, the float assembly and associated guide frame structure are not shown in FIG. 1, but will be described in more detail when particular reference is made to FIGS. 2, 3 and 5. Confined within the silo 10 is a shallow reservoir 20, with the water level in the reservoir being substantially below the water level of the open body of water surrounding the silo. Each pump assembly includes a pipe section commonly shown at 14 for withdrawing water from the reservoir into the lower pump chamber, and an outlet pipe commonly designated at 16 through which water is discharged from the pump to the open body of water surrounding the silo.

Two turbine generators are diagrammatically and commonly designated at 18 in FIG. 1, which are driven by water under hydrostatic pressure. Water under head pressure enters the turbine generators at the exterior of the silo, with the water discharged by the generators entering the reservoir 20 formed within the silo. Both the turbine generators 18 and water withdrawal pipes 14 are submerged in the reservoir, with the generators being mounted relatively adjacent the bottom of the silo so as to take maximum advantage of the hydrostatic head developed exterior to the silo. The turbine generators per se are conventional and have accordingly been illustrated only diagrammatically in the application drawings. It will be understood that the generators are suitably housed and that electrical energy produced by the turbine generators is taken off in any suitable, known manner forming no part of the present invention. Such energy can be used directly or can be used, for example, in conjunction with a hydrogen conversion installation on shore which could permit the energy produced to be stored and utilized as needed.

Figure 2:
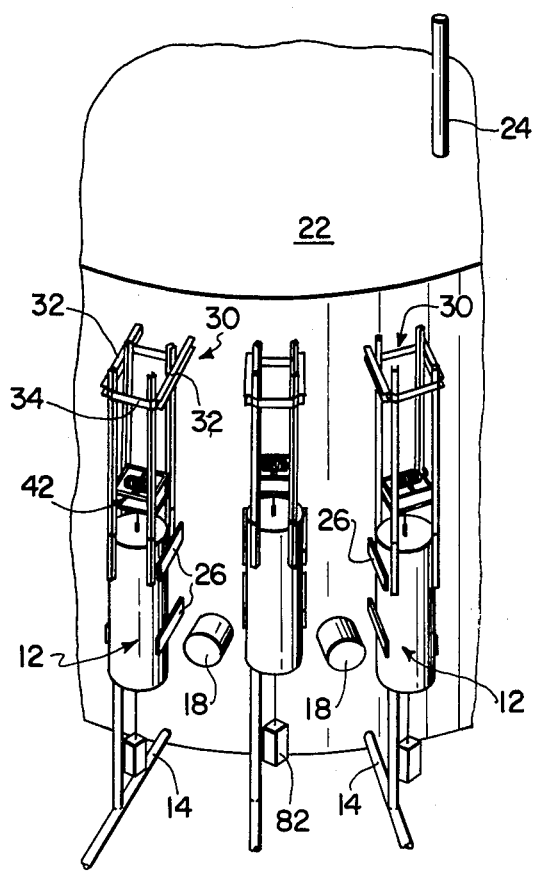
FIG. 2 is a perspective, fragmentary view showing a silo modification in which the silo is closed at the top, and showing a plurality of pump assemblies and associated floats mounted around the periphery of the silo.
Figure 3:
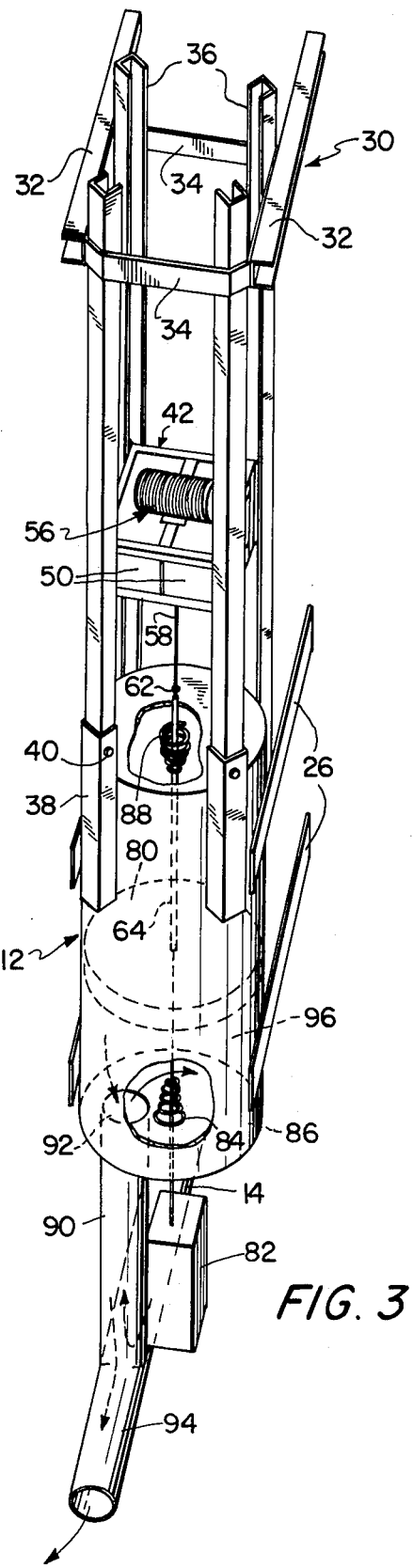
FIG. 3 is a perspective view showing a single pump housing mounted on the exterior wall of the silo, guide structure similarly mounted on the silo wall, and a frame containing floating members vertically movable within the guide structure.

Referring to FIGS. 2 and 3, there is illustrated therein a silo 10 which is formed with a closed top 22 as contrasted with the open top silo of FIG. 1. The closed silo provides protection from ambient conditions and can, if desired, be entirely submerged in the water. A fresh air intake pipe 24 extends through the top of the silo for admitting ambient air to the interior of the silo so that ambient pressure exists with the silo. As in FIG. 1, the interior of the silo serves to confine a relatively shallow water reservoir the level of which is substantially below the water level of the open body of water surrounding the silo.

The silo of either FIG. 1 or FIG. 2 can be constructed of any suitable materials, for example, concrete, and can be covered with steel plate or a plastic coating to resist corrosion in saline conditions. In the event steel plate is used as a covering material, a cathodic protection system is preferably employed where saline water conditions exist so as to minimize or eliminate corrosion. In the even the silo is covered with steel plate, the pump housings and associated guide frames can be welded to the structure. If only concrete is employed, the pump housings and guide frame structures can be secured thereto in any suitable manner such as, for example, anchor bolts or the like.

FIG. 2 comprises a fragmentary perspective view, and it will be understood that the arrangement of pump housings and guide frame structures as shown in FIG. 2 can extend around the entire outside periphery of the silo. Since the construction and mounting of each pump assembly and guide frame structure is essentially the same, the fragmentary view is deemed sufficiently illustrative of the invention concepts. In both FIGS. 1 and 2, the pump housings are shown alternatively mounted in radially spaced concentric circles. This facilitates constructionand assembly of the system components, as well as providing additional space for obtaining access to the components where maintenance may be necessary. A further advantage of the concentric arrangement of alternate pump housings is that the radial spacing of alternate float assemblies subjects the same to varying wave conditions. For example, a wave swell might initially contact and consequently move vertically the outer concentric circle of floats, with the inner circle of floats being subjected to the absolute wave crest. Thus, more efficient utilization of the complicated and everchanging vertical wave component is effected.

The silos of FIG. 1 or FIG. 2 can be installed on the floor of the body of water in any suitable manner. The weight of the structure is sufficient to permit the bottom of the silo to self-embed itself substantially into the ocean floor, and the degree of penetration can be supplemented as necessary or desired. The bottom of the silo should be sufficiently below the floor so as to preclude or minimize the seepage of water beneath the walls of the silo into the interior thereof whereby the water depth of the reservoir confined within the silo can be more closely controlled. Known techniques can be used for pouring concrete to form the silo walls in situ in framing submerged to the desired level. If the silo is poured in place, the depth of the silo walls must be sufficiently below the bottom surface so as to preclude significant seepage of water into the reservoir.

Each pump housing 12 is rigidly supported on the silo wall by means of supporting plates or straps 26 which are rigidly secured, for example, by welding, to the pump housing and anchored to the wall of the silo. Such anchoring can be effected by welding in the event the exterior of the silo is of steel plate or the like. Two such support straps are shown at each side of the pump housing, spaced vertically intermediate the height of the housing.

A rigid supporting frame generally indicated at 30 is located above the pump housing and includes channel support members 32 which are secured at their outer ends to a plate or strap 34 and anchored at their inner ends to the silo wall. As can be seen in FIG. 5, the strap 34 defines the interior dimensions of the frame. Mounted within the frame are generally U-shaped guide members, commonly designated at 36, which are positioned at each corner of the frame 30, as best seen in FIGS. 3 and 5. The guide members 36 can be secured in any suitable manner to the strap 34, for example, by welding. As shown in FIG. 5, the strap is formed with diagonally extending corner sections 35 against which the guide members are positioned so that the guide ways define open channels which are radial in location.

The guide members 36 are positioned at their lower ends within permanent sleeves 38 which are generally L-shaped in cross section and permanently secured to the pump housing. Removable fastening means diagrammatically shown at 40 are employed to secure the bottom portions of the guide members to the sleeves 38. Although only the front permanent sleeves are shown in FIG. 3, it will be understood that suitable sleeves enclose and are removably connected to the back guide members 36 as well. The removable connection of the guide members to the fixed sleeves 38 serves the important function of permitting the upper guide frame structure and float assembly positioned therewithin to be removed if necessary due to adverse weather conditions. This may be desirable in northern latitudes where icing is a seasonal problem.

As can best be seen in FIG. 5, a float carriage generally indicated at 40 is mounted for vertical movement within the rigid supporting frame 30. The float carriage comprises a plurality of generally L-shaped channel members 42 which are interconnected as shown to provide a generally rectangular box-like open carrier frame. The top assembly of channel members is spaced from the bottom assembly by corner channels 46 as shown. A bottom supporting plate 48 is mounted between front and rear bottom frame members, and two float members shown in dashed lines at 50 are supported on the bottom support member 48 and the inwardly directed horizontal flange portions of the bottom support members. The float members can be of any desired construction to provide the necessary buoyancy, and inflated nylon bags are highly satisfactory for this purpose.

A top plate 52 extends between the front and rear top frame members 44 for supporting a plate 54 on which a winch generally indicated at 56 is mounted. Cable 58 is wrapped around the winch, and a winch handle 60 is provided for paying out or retrieving the cable line as can be seen in FIG. 3. The bottom of the cable 58 is looped through a connection 62 which is secured to the upper end of piston rod 64 which extends through the pump housing. The piston rod is fixed to the pump piston as will be presently described, whereby the float carriage 42 can be vertically adjusted relative to the pump piston, and therefore the pump, by adjusting the length of cable between the float carrier and the piston rod. Thus, during installation of the system in a particular water environment, the float carrier can be vertically adjusted for optimum wave action.

The float carriage 42 is mounted for vertical movement in the supporting frame 30 as follows, reference being again made to FIG. 5. Extending diagonally outwardly at each corner of the float carriage, at both the top and bottom thereof, are roller bars commonly designated at 70 to the ends of which are mounted carriage rollers commonly designated at 72. These rollers are adapted to engage the inner web 74 of each guide member 36 so as to provide rolling movement of the float carriage relative to the supporting frame. During installation, the rollers 36 are mounted so as to be slightly spaced from the web 74 of each guide member so as to provide sufficient play in the mounting to avoid binding of the carriage as it moves upwardly and downwardly. It will be understood that as the float members 50 and thus the float carriage 42 are subjected to wave action, the force of such wave action has a vertical and horizontal component which tends to cant the carriage from a horizontal position. However, such movement away from the horizontal is limited by engagement of the carrier rollers with a particular guide frame member so as to maintain the float carriage in as substantially a horizontal position as possible.

Referring again to FIG. 3, a reciprocable pump piston 80 is mounted within the pump housing, with the piston rod 64 being rigidly secured to the piston and extending therethrough. The rod 64 is connected at 62 to the cable as previously described, and the bottom of the rod is secured to a counterweight 82. The function of the counterweight 82 is to bias the rod and thus the float carriage 42 downwardly at all times so as to return the piston rod toward the bottom of the pump housing after the wave crest has passed. During wave action, the vertical component of the wave force acts on the float members 50 to vertically raise the same thereby causing the piston 80 to be correspondingly raised.

The piston rod 64 extends through sealed openings in the top and bottom of the pump housing. A bottom spring 84 is mounted on the bottom wall 86 of the pump housing to cushion the piston 80 as it approaches its bottom position, and an upper spring 88 is mounted on the upper wall of the pump housing for cushioning and limiting the upward travel of the piston 80 when the float members are subjected to wave forces. The springs are compressed by the piston and serve the additional function of returning the piston from its top and bottom positions, respectively.

It will be understood that the counterweight 82 can be of suitable shape and formed of any suitable material to accomplish the intended purpose. It will further be understood that the weight of the counterweight will be calibrated with the weight of the float carriage 42, which also, due to gravity forces, supplements the downward movement of the piston 80 following the passing of the wave, and the weight will further be calibrated with the environmental conditions of the installation.

Figure 4:
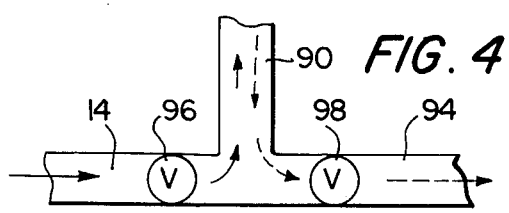
FIG. 4 is a fragmentary, partially schematic view showing the flow of water to and from the pump housing.

As above described, a pipe 14 is associated with each pump housing for withdrawing water from the reservoir within the silo and, referring to FIGS. 3 and 4, the pipe 14 communicates with a vertical pipe section 90 the upper end of which is mounted in an opening 92 provided therefor in the bottom wall 86 of the pump housing. A third pipe section 94 also communicates with the vertical pipe section 90 for discharging water from the lower pump chamber 96 during the pumping stroke. As shown in FIG. 4, a valve 96 is mounted at the juncture of the pipe sections 14 and 90, and a further valve 98 is mounted at the juncture of the pipe sections 90 and 94. These valves are of the one-way, pressure responsive type whereby water from pipe 14 is initially delivered to the lower pump chamber 96 through the pipe section 90 and water is discharged from the pump chamber downwardly through the pipe section 90 and out the discharge line 94 to the open body of water around the silo. During conditions of withdrawal of water from the reservoir through line 14, the lower pump chamber 96 will be at negative pressure due to the vertically upward movement of the piston 80 consequent to wave action, with the valve 96 opening by virtue of such pressure differential to permit water to be directed from line 14 upwardly through the pipe section 90 into the lower pump chamber 96. When the wave has passed, the counterweight 82 functions to force the piston 80 downwardly, as a result of which the pumping pressure in line 90 exceeds the pressure in line 94 at which time the valve 98 opens permitting water to be discharged through the pipe section 94. During discharge, the valve 96 is closed. The valves 94 and 96 per se form no part of the present invention, and it will be understood that any suitable pressure responsive valves can be used for the purpose intended. The valves have accordingly been shown in FIG. 4 only diagrammatically.

The installation and operation of the system will now be described in detail. The silo is constructed in the body of water at the desired location, which is determined to a large extend by the depth of water. In this regard, a minimum differential of 15 feet is preferred, that is, the difference in the water level in the reservoir confined within the silo and the water level of the open body of water surrounding the silo should be at least 15 feet, and is preferably in the range of 30–50 feet. At this preferred level, substantial hydrostatic pressure is created and maintained.

Although the dimensions of the silo are not absolutely critical, studies have indicated that a silo approximately 80 feet high and having an exterior diameter of 60–90 feet will provide the desired pressure differential. If constructed of concrete, the walls of the silo are preferably approximately two feet in thickness, although the wall thickness may be more or less, depending on the height of the silo, the number of pump and float assemblies, and environmental conditions. In the FIG. 1 form of the invention, at least part of the silo would of course extend above the water level, taking into account tidal effects on water level, and the maximum waves that can be reasonably expected. The closed top silo form of FIG. 2 could be entirely submerged, as above explained. In either event, the silo should be embedded sufficiently deep into the bottom so as to avoid seepage of water below the silo wall into the reservoir.

Once the silo is formed, the pump housings are mounted thereon, and the rigid supporting frames are anchored to the silo walls above the pump housings. During formation of the silo, water withdrawal lines 14 are positioned and precast into the silo, as are openings for the turbine generators 18. It will be understood, although not shown, that the turbine generators will be housed as necessary to protect the generators from the submerged environment. The housings for the turbine generators can likewise be formed during the construction of the silo.

After the pump housings, the supporting frame and the float carriage and floats have been installed, the position of the carriage relative to the pump housing is adjusted by the winch 56 as above described. The adjusted location will depend upon the water level in the body of water surrounding the silo so as to subject the float carriage and float members to maximum wave action. As noted, the float carriage and float members can be entirely submerged as long as the floats are exposed to sufficient wave action.

In operation, wave forces contact the float members of each assembly thereby raising the float members and float carriages, with the vertical movement being guided by the carriage rollers 72. As the float members are raised, the piston 80 of each pump is forced upwardly by virtue of its coupling to the float carriage, thereby creating a negative pressure condition in the lower pump chamber 96. As a result, water is directed through the associated pipe 14 from the reservoir, through vertical pipe section 90 into the lower pump chamber 96 through opening 92. Valve 96 permits such flow, and valve 98 is closed at this time. As a result, the water level in the reservoir is reduced. After the wave has passed, the counterweights force the pistons 80 downwardly, thereby pumping the water in the lower pumping chambers 96 through the vertical pipe sections 90, open valves 98, and pipe sections 94 to the surrounding body of water. As a result of the transfer of water from the reservoir to the body of water surrounding the silo, the hydrostatic pressure of the water surrounding the silo, water is forced through the turbine generators 18, with the water discharged from the turbines entering the reservoir to complete the cycle. The amount of water discharged by the turbine generators is substantially the same as the amount of water withdrawn from the reservoir, whereby equilibrium of the system is maintained.

Based on a silo 60 feet in diameter having 20 pumps mounted around the periphery thereof, and assuming that each pump chamber is 20 feet in height, each pump piston 10 feet in diameter, and assuming an average efficient factor of 50% in a 4 foot sea or wave environment, the energy produced by the wave forces can be calculated as follows:

1. The volume of each pumping chamber equals $\pi R^2 h = 3.14 \times 25 \times 2 = 157$ cu. ft. The 50% efficiency refers to the average vertical movement of the piston in 4 foot waves, in this instance 2 feet. This average takes into account the fact a particular pump is not always exposed to the crest of the wave.
2. The weight of water handled per pump, per single vertical movement, equals $157 \times 62.4$ (weight per cubic foot of water), or 97.97 lbs., or approximately 4.90 tons.
3. The weight handled per minute, per pump (assuming 12 waves per minute) equals: $4.90$ tons $\times 12 = 58.8$ tons per minute.
4. Assuming 20 pumps, the total weight handled per minute equals: 20 pumps $\times 58.8 = 1176.0$ tons, or equivalent to approximately 800 HP, or slightly less than 1 megawatt per entire system.

Although the dimensional and weight factors in the above calculations are non-variable once the installation is in place, the volume of the pumping chamber will vary depending on wave conditions. For example, with six foot waves, the energy equivalent would be increased 50%, and the energy equivalent is doubled for each additional two feet of piston travel. Similarly, the energy produced is proportionately less, based on the square of the radius, where the diameter of the pump piston or the height of the pump housing is less than used in the calculations.

It will be seen that the energy produced is entirely due to wave action forces, and is translated into hydrostatic pressure which in turn produces electrical energy from the turbine generators. By pumping water from the reservoir and subsequently replenishing the reservoir with water discharged from the turbine generators, a predetermined differential or head can be maintained between the water level in the reservoir and the water level surrounding the silo. Although two turbine generators have been shown in the application drawings, it will be understood that several could be employed, and that the number employed will be related to the number of pump housings and consequently the amount of water withdrawn from the reservoir.

As previously described, the support structure for the pump assemblies and related float structure can comprise a cofferdam rather than a silo construction as shown in FIGS. 1 and 2. Referring to FIG. 6, there is illustrated therein in plan view a cofferdam generally indicated at 100 which includes side walls 102 and a front wall 104 interconnected to the side walls. A plurality of pump assemblies 12 are shown mounted on the exterior side of the cofferdam, and turbine generators 18 are diagrammatically shown installed through the front wall 104 of the cofferdam. It will be understood that the pump housing construction, and the float carriage and guide means therefor, are similar to that shown in FIGS. 1-3 and 5, and previously described. The walls 102 extend to and beyond the shore line SL thereby confining the water within the cofferdam to form a relatively shallow reservoir 106. As in the previous forms, each pump assembly includes a water withdrawal pipe 14 through which water can be withdrawn from the reservoir 106 and subsequently pumped to the body of water surrounding the cofferdam. The size and location of the cofferdam are such that the necessary differential in water levels between the reservoir and the open body of water is maintained. The operation of the system is as described above, with water being drawn from the reservoir in response to wave action forces, and being returned to the reservoir by the discharge of the turbine generators. This maintained hydrostatic head drives the turbine generators. Although only a relatively few pump assemblies have been shown in FIG. 6, it will be understood that pump assemblies could be positioned continuously along the sides of the cofferdam, and can be alternately spaced at varying distances from the cofferdam walls as shown in the previous forms.

Although the particular materials employed in the system can be selected as desired, it is preferred that materials be used so as to minimize maintenance of the system. For example, the pump housings could be formed entirely of or coated with plastic to avoid corrosion and algae build up. Likewise, the piston and piston rod could be formed of plastic or non-corrodable materials, as can other components of the system. To the extent that corrodable metal is employed, cathodic protection systems are preferably employed, particularly in saline water installations.

We claim:

1. A hydrodynamic electric generating system for producing electrical energy from wave action, comprising
   (a) support means mounted on the floor of a body of water, said support means being mounted relative to said body of water so as to separate the same into a relatively shallow reservoir confined by said support means and an open body of water at normal water level and subjected to wave action, the difference in water levels between said confined shallow reservoir and said open body of water creating a controllable hydrostatic pressure head,
   (b) a plurality of pumps mounted on said support means in said open body of water, each of said pumps including a housing, a piston mounted for reciprocal movement in said housing and forming upper and lower pump chambers, and a piston rod extending vertically in sealed relation through said pump housing and secured to said piston,
   (c) pipe means associated with each pump and communicating with said reservoir, the bottom chamber of said pump and said open body of water,
   (d) valve means to control water flow first from said reservoir to said lower pump chamber during upward movement of said piston in response to wave action, and then from said lower chamber to said open body of water,
   (e) float means operatively connected to the upper end of said piston rod of each pump and vertically positioned so as to be exposed to wave action,
   (f) counterweight means secured to the bottom of said piston rod for biasing the same downwardly,
   (g) frame means secured to said support means for guiding the vertical movement of said float means, and
   (h) electric generating means mounted in said support means in a position substantially below the water level in said shallow reservoir,
whereby the vertically upward wave action causes said floats and thus said pistons to move upwardly creating an area of lower pressure in said lower pumping chambers thereby inducing water flow from said reservoir through said pipe means into the lower pumping chambers, the cessation of upward wave action force resulting in said counterweights vertically moving said pistons downwardly thereby pumping water from said lower chambers through said pipe means into said open body of water, the water pumped into said open body of water from said plurality of pumps maintaining a hydrostatic pressure head of sufficient magnitude to force water through said electric generating means to produce electrical energy, the water passing through said electric generating means in turn flowing into said reservoir to replenish the water previously drawn therefrom during vertically upward wave motion.

2. The system of claim 1 wherein said support means comprises a cofferdam in which said pumps are mounted on the exterior wall thereof, with the side walls of said cofferdam extending inwardly to confine a thus formed shallow reservoir.

3. The system of claim 1 wherein said support means comprises a silo mounted in said body of water, said pumps being mounted on the exterior of said silo, with the interior of said silo defining said shallow reservoir.

4. The system of claim 3 wherein said silo is closed at the top and provided with venting means by means of which the interior of said silo can be maintained at ambient pressure.

5. The system of claim 3 wherein said silo is open at the top, with the height of said silo being above the maximum crest height of the waves.

6. The system of claim 1 wherein said electric generating means comprises a plurality of turbine generators mounted in said support means relatively adjacent the bottom thereof, hydrostatic pressure effecting movement of water through said turbine generators.

7. The system of claim 1 wherein each of said pumps includes an opening in the bottom wall thereof which communicates with said pipe means, said opening being the sole inlet and outlet for pumping water into said lower chamber and discharging water therefrom, respectively.

8. The system of claim 7 wherein each of said pump housings is formed with spring means on the top and bottom walls thereof thereby to cushion and form a limit for the upward and downward movement of said piston in said housing.

9. The system of claim 1 wherein said float means comprises a float carriage and a plurality of float members positioned within said carriage, said carriage having operatively connected thereto carriage rollers which extend into said frame means for guiding the vertical movement of said float carriage and said float members.

10. The system of claim 9 further including a cable interconnecting said float carriage and said piston rod, and means for adjusting the payout of said cable thereby adjusting the normal spacing of said float carriage from the associated fixed pump housing.

11. The system of claim 1 wherein said frame means for guiding the vertical movement of said float means comprises a plurality of rigid support members attached to said support means, a plurality of vertically extending, generally U-shaped guide members secured to said support members at their upper ends and operatively connected to said pump housing at their lower ends, said U-shaped guide members each defining a guide way for receiving a corresponding guide means mounted on said float means.

12. The system of claim 11 wherein said guide means include rollers, and wherein said float means comprises a plurality of interconnected channel members forming an open, box-like float carriage and a pair of float members positioned within said float carriage and adapted to be vertically movable therewith in response to wave action forces.

13. The system of claim 9 wherein said guide members are positioned at their lower ends within correspondingly shaped sleeves permanently mounted on said pump housing, and means for removably connecting the bottom ends of said guide members to said sleeves for permitting removal of said guide members and the structure supported thereby.

14. The system of claim 1 wherein said pipe means comprises a first pipe section extending into said reservoir, a second pipe section communicating said first section with said bottom chamber, and a third pipe section intercommunicating said second pipe section with said open body of water, said valve means comprising a first valve at the juncture of said first and second pipe sections and a second valve at the juncture of said second and third pipe sections, thereby to control water flow first from said reservoir to said lower pump chamber during upward movement of said piston in response to wave action, and then from said lower chamber through said second pipe section to said third pipe section to said body of water.

* * * * *